(No Model.)

E. A. REED.
GRAPPLE ADJUSTER.

No. 373,194. Patented Nov. 15, 1887.

Witnesses
Frederick M Laughton
J. W. Tibbetts

Inventor
Edwin A. Reed.
By his Attorney P. M. J. Lander

UNITED STATES PATENT OFFICE.

EDWIN A. REED, OF SPRINGFIELD, MAINE.

GRAPPLE-ADJUSTER.

SPECIFICATION forming part of Letters Patent No. 373,194, dated November 15, 1887.

Application filed September 17, 1887. Serial No. 249,956. (No model.)

*To all whom it may concern:*

Be it known that I, EDWIN A. REED, a citizen of the United States, residing at Springfield, in the county of Penobscot and State of Maine, have invented a new and useful Grapple-Adjuster; and I do hereby declare that the following is a full, clear, and exact description of the invention, which will enable others skilled in the art to which it appertains to make and use the same.

My invention consists of an improved grapple-adjuster, used for adjusting and displacing grapples to and from rafters or beams.

In adjusting grapples used in hay-hoisting apparatus to the beams and rafters of a barn considerable difficulty is experienced in securing them at the point or place on a rafter where they will be the most convenient for operation. Ladders are obliged to be used, and unless a person has quite a number of different lengths even then it is difficult, and there are places in some barns that cannot be reached.

Grapples used in hay-hoisting are continually being changed from one beam or rafter to another as fast as one part of the hay-loft is filled; and it is to effect an easy and rapid transfer of the grapple and its tackle from one place to another to adjust it firmly and secure in any place that would be most convenient or necessary to attach and operate the same that I have invented my device.

In the description reference is made to the accompanying drawings, in which—

Figure 1:
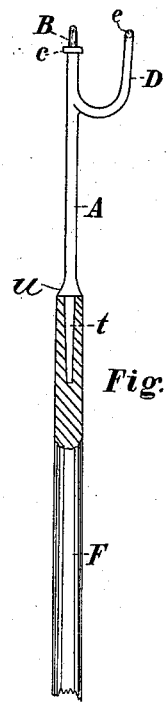
Figure 2:
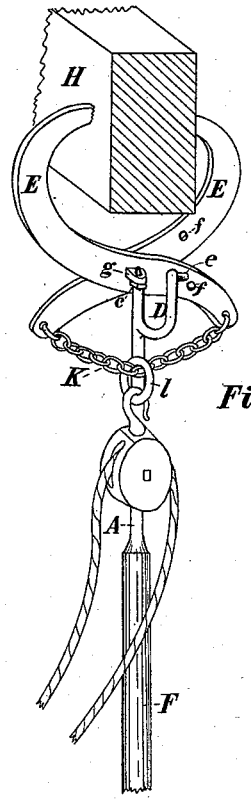
Figure 3:
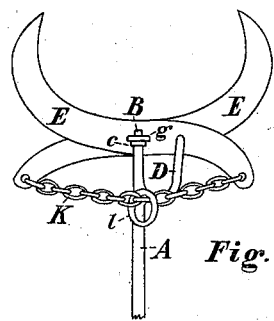
Figure 4:
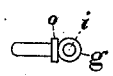

Figure 1 is an elevation of my improved grapple-adjuster. Fig. 2 is a perspective view of a grapple and the adjuster, showing the method of attaching a grapple to a beam. Fig. 3 is an elevation of a grapple and the adjuster holding the jaws open. Fig. 4 is a plan of the pin used to connect the grapple-jaws.

Similar letters of reference refer to corresponding parts throughout the different figures.

In manufacturing my grapple-adjuster I take a common straight iron rod or shank, A, (any other metal of sufficient stiffness may be used,) and sharpen out one end by drawing it down to a sufficient taper, so that it may be easily driven into the end of a pole. A shoulder may be made at $l\ l$, if desired, that will prevent the shank A from being driven in too far. The upper end of the rod or shank A of my device is reduced in size for about one inch from the end of the same, and a small collar, $c$, shrunk on; but if the shank A is of sufficient size to allow the end B to be reduced to three-eighths in diameter, and still leave a good shoulder on the rod at this place, the collar $c$ may be dispensed with. About three or four inches from the upper end of the shank A, I weld a similar metal rod, D, bent in the form of a U. Its upper or free end for about three-quarters of an inch in length is bent at right angles from the plane of projection, and forms a short spur, $e$. Both the end B and spur $e$ are made slightly tapering, to allow them to be easily withdrawn from a grapple after securing the latter. The length of the U-shaped rod D should be such that when bent to the proper form its upper or free end is about the same height as the end B of the rod A.

In order to use my grapple-adjuster with the ordinary grapples, to hold open the jaws of the latter and secure the same to a beam, I substitute for the common rivet used in connecting the two jaws of the grapple a rivet having a ring in one end, as shown in Fig. 4. This rivet is made as follows: A bar of iron, the same diameter as the hole drilled through the grapple-jaws, is heated at one end and bent to the form of a ring $g$, the center $i$ of which is made large enough for receiving the end B of the grapple-adjuster. A small collar or washer, $o$, may, if the grapple used is very large, be shrunk on this bar close to the ring $g$, and the rod cut off long enough to pass through the grapple-irons E E and rivet on the other side. This leaves the ring $g$ projecting from one side of the grapple, and the rivet is made small enough to turn freely, irrespective of the grapple-jaws E E. The collar or washer $o$ on the grapple-pin may, if desired, be dispensed with altogether, as it is only useful on very large grapples, where a washer is generally placed each side of the grapple-jaws. I now drill two holes, $f\ f$, through the sides of the grapple the same distance from the rivet-ring $g$ as the distance between the end B and spur $e$ of the grapple-adjuster, said holes being so drilled as to coincide with each other when the jaws E E are opened, as in Fig. 3.

The manner of using my grapple-adjuster is as follows: The jaws E E of the grapple are opened until the holes $ff$ are opposite each other. The end B of the adjuster is slipped into the ring $g$, the collar $c$ preventing it from going through too far, and the spur $e$ made to enter the holes $ff$. This spur holds the jaws E E open and prevents their shutting up, while the ring $g$, resting on the collar or shoulder $c$ of the adjuster, holds the grapple securely, allowing it to be raised any height without slipping off. The grapple, with its tackle attached, can now be raised until the jaws E E are placed astride a beam or rafter, the spur $e$ being thrown out of the holes $ff$ by simply giving the pole F an outward turn, the taper of the spur $e$ facilitating an easy extraction from said holes. The jaws E E will then close upon the beam H, as shown in Fig. 2. The weight of the tackle bearing down on the ring $l$, sliding on the connecting-chain K, draws the lower ends of the grapple together, at the same time forcing the points of the jaws E E into the beam H. A quick jerk downward on the tackle securely fastens the grapple to the beam, and any further weight aids in driving the points more deeply and firmly into the timber.

The grapple-jaws E E are easily released from their hold of the beam by slipping the U-shaped projection of the grapple-adjuster astride one of the lower ends of the grapple inside of the chain and pressing up thereon. The grapple being thus released from any downward strain, the jaws E E will open and hang suspended on the adjuster.

Having thus described my invention, what I claim, and desire to secure by Letters Patent, is—

1. An improved grapple-adjuster consisting of the shank A, having its end B shouldered, and the projection D, containing the right-angular projecting spur $e$ extending therefrom, in combination with the pole F, substantially as shown and described.

2. The combination of the grapple-adjuster composed of the shank A, a shouldered end, B, and the U-shaped rod D, having an angular spur, $e$, with a grapple having two holes, $ff$, drilled through its sides, arranged to coincide with each other when the grapple-jaws are opened, and a grapple-pin having a ring, $g$, extending therefrom, substantially for the purpose as shown and described.

EDWIN A. REED.

Witnesses:
LLOYD W. DRAKE,
PRINCE K. LEWIS.